United States Patent
Morgan et al.

(10) Patent No.: US 6,270,668 B1
(45) Date of Patent: Aug. 7, 2001

(54) FILTER ELEMENT SEALING MECHANISM

(75) Inventors: Dennis R. Morgan, Howard, OH (US); Edd D. Gryder, Evansville, WI (US)

(73) Assignee: Harvard Corporation, Evansville, WI (US)

( * ) Notice: Subject to any disclaimer, the term of this patent is extended or adjusted under 35 U.S.C. 154(b) by 0 days.

(21) Appl. No.: 09/082,734

(22) Filed: May 21, 1998

(Under 37 CFR 1.47)

(51) Int. Cl.[7] .......................... B01D 27/07; B01D 29/50; B01D 35/00
(52) U.S. Cl. .......................... 210/232; 210/314; 210/439; 210/488; 210/497.1
(58) Field of Search .................... 210/232, 439, 210/435, 437, 438, 440, 441, 443, 453, 454, 488, 314, 497.11

(56) References Cited

U.S. PATENT DOCUMENTS

| | | | |
|---|---|---|---|
| 2,076,934 | 4/1937 | Burckhalter | 210/134 |
| 2,459,376 | 1/1949 | Hallinan | 210/120 |
| 2,731,150 | 1/1956 | McCann | 210/13 |
| 3,504,803 | 4/1970 | Brayman | 210/439 |
| 3,986,960 | 10/1976 | Wire et al. | 210/232 |
| 4,017,400 | 4/1977 | Schade | 210/439 |
| 4,366,057 | 12/1982 | Bridges et al. | 210/437 |
| 4,454,036 | 6/1984 | Suzuki | 210/117 |
| 4,575,422 | 3/1986 | Zimmer | 210/130 |
| 4,579,657 | 4/1986 | Hood, Jr. et al. | 210/314 |
| 4,588,503 | 5/1986 | Sigiura | 210/232 |
| 4,738,776 | 4/1988 | Brown | 210/168 |
| 4,751,901 | 6/1988 | Moor | 123/196 |
| 4,773,990 | 9/1988 | Hood, Jr. | 210/314 |
| 4,773,999 | 9/1988 | Schade | 210/315 |
| 4,780,204 | 10/1988 | Rasmussen et al. | 210/314 |
| 4,783,262 | 11/1988 | Ostreicher et al. | 210/314 |
| 4,792,397 | 12/1988 | Rasmussen | 210/314 |
| 4,853,120 | 8/1989 | Frantz | 210/184 |
| 4,869,820 | 9/1989 | Yee | 210/316 |
| 4,876,007 | 10/1989 | Naruo et al. | 210/339 |
| 4,976,852 | 12/1990 | Janik et al. | 210/86 |
| 5,080,791 | 1/1992 | Sims | 210/497.1 |
| 5,178,753 | 1/1993 | Trabold | 210/130 |
| 5,232,588 | 8/1993 | Gryder | 210/168 |
| 5,247,876 | 9/1993 | Wilson et al. | 99/408 |
| 5,271,850 | 12/1993 | Stutzman | 210/767 |
| 5,486,290 | 1/1996 | McGuinness et al. | 210/323.2 |

FOREIGN PATENT DOCUMENTS

| | | |
|---|---|---|
| 534420 | 12/1956 | (CA) . |
| WO 88/05335 | 7/1988 | (DE) . |
| WO 89/06567 | 7/1989 | (GB) . |
| 2220866A | 1/1990 | (GB) . |
| 47-1744 | 1/1972 | (JP) . |
| 47-13219 | 4/1972 | (JP) . |

OTHER PUBLICATIONS

Hydra–Tech Hydraulics, Inc. sales brochure (8 pages), date uncertain.

Primary Examiner—Robert Popovics
(74) Attorney, Agent, or Firm—Santangelo Law Offices, P.C.

(57) ABSTRACT

The present invention typically involves the use of a compressed blocking area to assist in sealing a filter element and avoiding channeling in a wound fibrous tissue filtering system. It may involve the use of multiple, spaced, interstitial rings. It may involve the intentional wasting of a portion of the filter element to create a compressed blocking area. It may also involve the use of different heights of the rings and may include the use of compression and secondary tapers on the rings. The heights and spacing of the rings with respect to the other ring or rings may vary in a certain ratio.

55 Claims, 9 Drawing Sheets

Section A — A

FILTER ELEMENT SEALING MECHANISM

I. FIELD OF INVENTION

The field of the present invention relates to fluid filtering systems and techniques in general and to fluid filter collector systems in particular.

II. BACKGROUND OF THE INVENTION

There is a maxim that four quarts of clean oil mixed with one quart of dirty oil makes five quarts of dirty oil. In the area of fluid filtering apparatus and related filtering applications, this is especially true. Modern vehicles and industrial machinery rely on a number of recirculating fluids for effective operation. Effective filtration of these fluids can extend the life of the apparatus and maintain the operation at high levels of performance. Furthermore, to the extent fluids can be maintained free of contamination, the life of the fluid itself is extended, saving cost due to fluid replacement and machinery downtime.

One particularly effective type of fluid filter causes fluids to flow interstitially between layers of fibrous tissue which have been wound about an inner core. Such fluid filters may be packaged either as disposable canisters, replaceable cartridges, or as containers for containing generally one or more filter elements. In-flow and out-flow connections provide the container's inlet and outlet ports. By flowing interstitially between the layers of filtering tissues, dirt and smudge is removed from the fluid by the tissue layers. The fluid exits the filter element and then is directed by a fluid collector through passageways to a flow path which is fluidicly connected to the outlet port.

Because of the efficiency and quality of wound fibrous tissue filtering systems, the popularity of such systems has increased. However, this popularity has not been without a need to improve the various sealing areas of the filtering tissue systems. For instance, because the filtering fluid typically flows interstitially and not transversely through the wound media, a problem known as "channeling" can occur. Channeling typically has the effect of short circuiting the filtering process. It may occur, for instance, due to localized high pressures that open the space between wound layers of fibers such that a larger portion of unfiltered fluid may pass. Furthermore, in using these and other types of filters, other leakages can occur. For instance, leakages can occur around the ends of the filtering elements such that unfiltered fluid from an unfiltered flow path leaks into a filtered flow path and contaminates what fluid was actually filtered. Thus, it is critical to seal the unfiltered fluid from the filtered fluid.

Another example relates to the use of multiple filter element in a filtering system. To increase the flow through a filtering system, it is often desirable to provide a plurality of stacked tissue elements to minimize flow resistance. However, the junctions between the multiple elements is prone to leakage of unfiltered fluid into filtered fluid. To reduce this problem, a fluid collector is typically used.

A typical fluid collector serves to seal the end of the filter element from leakage of unfiltered fluid to filtered fluid. In multiple tissue element systems, it may also separate the fibrous tissue rolls from one another and provide passage for filtered fluid to leave the filter element. Fluid collectors, generally known in the art, may be formed which may have a plurality of alternating radial slots and ridges with the ridges serving to space the fibrous tissue roll elements from the collector and the slot serving to direct the filtered fluid into a central flow tube. A separate fluid collector may be used or the function of a fluid collector may be built into a container. Typical materials include various hard plastics known to those in the art such as Delrin 500, nylon, or other suitable materials.

A further complication of using wound fibrous layers is from the differential pressure generated from the unfiltered flow path to the filtered flow path. Typically, the unfiltered flow path will have a higher pressure than the pressure of the filtered flow path due to the pressure drop through the fluid filter. This differential pressure may create extra stress on the fibrous layers and overall compress the layers away from the higher pressure, typically, toward the inner core and the filtered fluid path. These substantial compressive forces are described in U.S. Pat. No. 4,792,397 to Rasmussen in column 1, lines 35–49 as follows:

> Substantial compressive forces are exerted hydraulically on the tissue layers. These forces tend to compress and deform the filter elements, particularly at the end of each filter element where the filter fluid exits into a collector. As disclosed in U.S. Pat. No. 4,017,400 to Schade, these collectors often have an annular portion which extends into the adjacent filter element ends to form a seal which separates the filtered fluid from the unfiltered fluid. Nevertheless, deformation of the filter element at its exit end may cause flow channels to form which then allow fluid to flow around the annular seal and thus entirely bypass the filter element. As a result, a significant amount of unfiltered fluid can pass around the deformed filter element without removal of contaminants.

Obviously, in using these wound fibrous tissue filter elements, such leakage can occur from using one or a plurality of such filter elements in any given system. As is noted in U.S. Pat. No. 4,773,990 to Hood in column 1, lines 24–42:

> A significant problem associated with the use of axial flow filters has been leakage of contaminated fluid around the wound tissue filter element. Ordinarily, filter elements are positioned on a flow tube and contaminated fluid is directed to one axial end surface of the element where the fluid enters the tissue layers in an axial direction, flows through the layers, and out the opposite axial end surface of the element into an annular channel then into the flow tube. The pressure differentials between the axial ends of the element, and between the outer cylindrical surface of the elements and the annular channel are typically very high, encouraging leakage around the elements, permitting unfiltered fluid to contaminate the filtered fluid. Numerous attempts have been made to fashion a seal which will prevent a flow bypass of this type.

In recognizing some of the problems, various inventors have suggested solutions. One such solution is seen in U.S. Pat. No. 271,850 to Stutzman. In that patent, reduction of leakage bypassing is discussed in terms of axial compression in column 5, lines 18–23:

> Bypassing is precluded in the apparatus of this invention by squeezing the filter cartridge from top and bottom between circular stub edges to indent the cartridge faces so tightly that no fluid can flow regularly to the axial bore or the outflow pipe without proceeding axially through one-half of the dual cartridge.

However, other inventions realize that there is a practical limit to how tight the actual ends can be squeezed to reduce leakage and perhaps rely instead on other methods of sealing.

U.S. Pat. No. 4,017,400 to Schade appears to attempt to find a solution in sealing the outer periphery of the filter element against the container wall and providing an "interlocking annular seal" in column 1, line 64–column 2, line 2.

An interlocking annular seal provided in the manner of this invention is enhanced in efficiency by application of radial pressure and will resist failure under extreme pressure better than seals formed by axial compression of a filter element or by an annular sealing ring which causes the filter element to be squeezed and deformed radially.

Noteworthy, this was a single ring which apparently attempted to restrain the filter element from pulling away from the inner container wall surface. Unfortunately, Schade and others apparently realized subsequent to this patent that this was not a final solution.

While the Schade '400 reference may have recognized an issue of radial compression, it apparently did not offer a satisfactory solution. In U.S. Pat. No. 4,366,057 to Bridges et. al., the Schade '400 reference is described. As a background, that reference indicates that a "pressure drop across the filter may be in excess of 90 P.S.I., resulting in substantial compressive forces being exerted hydraulically on the filter tissue. These forces tend to compress and distort the filter element, particularly at the return or exhaust ends thereof." (Column 1, lines 33–38). Then, the Bridges '057 reference describes that the Schade '400 reference provided an interlocking annular seal inserted into the filter element a few layers inwardly of the perimeter of the filter element. The Bridges '057 reference continues in stating in Column 1, lines 45–52, However, it has been discovered that even with such an annular seal, the great hydraulic forces within the filter still results in deformation of the filter element. This causes flow channels to form which allow fluid to flow around the annular seal and thus bypass entirely the filter element. The result is that a significant amount of unfiltered oil is recirculated without removal of much of the contaminates.

U.S. Pat. No. 4,773,999 to Schade, approximately eleven years later after the Schade '400 reference, noted that "provision of an effective seal about the outer periphery of the outflow gallery is especially problematic because the configuration of the wound tissue rolls tend to distort under the effects of the differential pressure and the rolls tend to be compressed so as to pull away from less conformable sealing means, . . . " (Column 1, lines 19–25). The Schade '999 reference attempted to solve the earlier problems by providing a seal "between filter elements by wrappings of filter medium tissue being applied around the outer peripheral surfaces of the elements to at least partially encase such surfaces and completely overlap the space between the elements which comprises the filtrate overflow gallery." (Column 1, lines 48–54) In other words, it appears that Schade attempted to solve the sealing problems by providing an outer "sock" that overlaps the gap between multiple filter elements, with the inference from the Schade '999 reference that interstitial sealing by flow collectors and similar devices was ineffective.

The next generation of improvements in attempting to better seal against this type of leakage is perhaps found is U.S. Pat. No. 4,780,204 to Rasmussen assigned to Harvard Corporation of Evansville, Wis. Among other things in that reference, the concept of placing an annular ring portion inwardly a few tissue layers was extended to allow a taper to a sharp edge to more easily push the fluid collector between the layers of filtered tissue of adjacent filter element ends without damaging the tissue. (Column 5, lines 27–32) However, even with this improvement, some additional improvement was needed.

Another improvement is seen in U.S. Pat. No. 4,792,397 to Rasmussen and assigned to Harvard Corporation. In that reference, two outer rings in proximity to each other appear to be disclosed. One ring does not appear to engage the interstitial layers, but is located on the outside of the layers of tissue with an overlapping sheet made from a material typically known under the trademark "Mylar" to attempt to seal the intersection of the ends of the two filter elements. A second ring is located proximate to the outer ring and appears in functional similarity to the ring of the Rasmussen '204 reference. The Rasmussen '397 reference attempted to restrict the outer movement of the tissue layers in the filter and avoid compressing the filter against the container wall causing difficult removal. This perhaps was a problem in the Schade '400 reference where the filter element may have become lodged against the container wall and difficult to remove. However, the Rasmussen '397 reference does not appear to have accounted for circular inconsistencies in the outer periphery of a wound filter element. For instance, if the filter element were wound in an oblong fashion, one of the two seals, if not indeed both of them, might escape interstitial sealing against the wound layers.

Thus, the field of the present invention is such that economics and efficiency are realized by using wound tissue layers. However, the need still exists for improved leakage control both between the wound tissues of layers as well as around the sealing ends of the filter elements.

Ironically, the development and filtration and improvements in leakage control have prompted the emergence of previously unencountered or unnoticed weaknesses in the filtration system. That is, the more tightly sealed filter elements have been found, on occasion, to develop axial flow bypass channels down through the filter elements themselves. These bypass channels may result in direct, substantially uninhibited, flow communication between the fluid entry surface and the fluid exit surface by allowing unfiltered fluid to completely escape filtration. This unexpected occurrence has presented new problems for filter manufacturers and developers. Thus, as various problems have been solved, other problems have developed. The technology has seen an increase of the need for further leakage control. The present invention fulfills this extra need.

Figure 1:
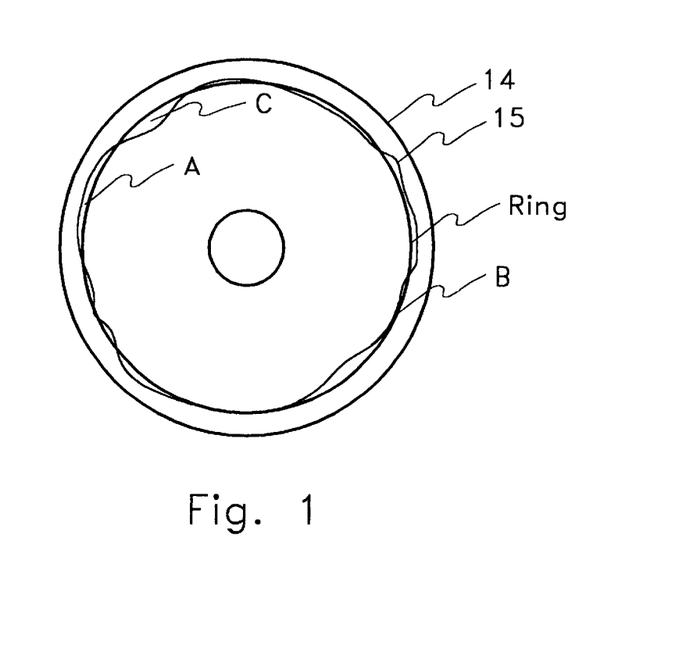
FIG. 1 represents an out-of-round filter element.

Part of the problems remaining from prior endeavors appear to be caused by not realizing the real world aspects of manufacturing wound tissue filter elements. Pictorially, this is represented in FIG. 1. As can be seen, the outer circle could be a container wall (14), ring, and so forth. The inner circle could be a ring such as disclosed in the above-references. In some instances, the ring could engage interstitially a portion of the filtering medium between the tissue layers (area A). In some instances, the engagement could be minimal (area B) and in other instances perhaps not at all (area C). Thus, unfiltered fluid, in seeking the path of least resistance, could seek out the minimal or no engagement areas and leak past the rings into the filtered flow path and contaminate the filtered fluid. The present invention, at least in one goal, seeks to remedy this apparent deficiency.

Figure 2:
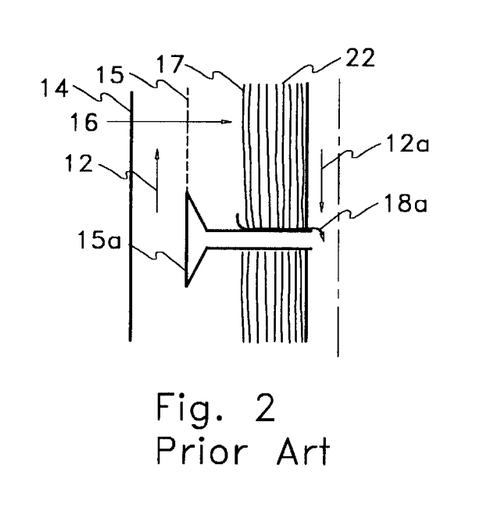
FIG. 2 represents a prior art non-interstitial ring.

Another aspect that may have been realized by some inventors and yet not apparently fully resolved is shown in FIG. 2. An unfiltered flow path (12) containing the unfiltered fluid typically flows between the container walls (14) and the original outer periphery (15) of a filter element. However, because of pressure differences between the unfiltered flow path (12) and the filtered flow path (12a), a hydraulic flow force (16) may be directed against the filter element and may compress the wound layers of tissue (22).

This compression may move the original outer periphery (15) to a new resulting outer periphery (17) of the filter element after the hydraulic flow force compresses the element. Because the hydraulic flow force may be strong, this may drive unfiltered fluid through a leakage channel (18a) into the filtered flow path (12a) and contaminate the filtered fluid.

Figure 3:
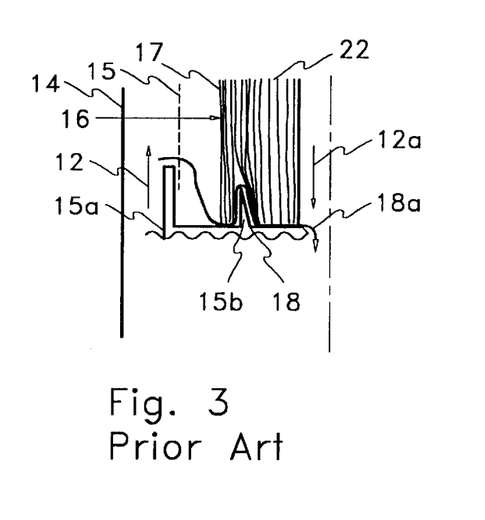
FIG. 3 represents a prior art non-interstitial ring with a single interstitial ring.

FIG. 3 shows an improvement by using at least two rings, one non-interstitial ring (15a) and a single interstitial ring (15b). However, as described in FIG. 2, it appears that the hydraulic flow force (16) may also force leakage in a similar manner as in FIG. 2. This may occur for at least two reasons. First, by using a non-interstitial outer ring, the difficulty of varying thickness (as described in FIG. 1), does not assure an engagement of a sufficient amount of wound layers of tissue (22) between the non-interstitial ring (15a) and single interstitial ring (15b). Thus, the hydraulic flow force may likewise drive unfiltered fluid along the similar leakage channel (18a). A second reason is that there may be a hydraulic flow force that forces the wound layers of tissue (22) on the inside circumference of the single interstitial ring (15b) such that a non-engaged area (18) appears. It may be that this was originally thought to be a seal but appears ineffective because of the hydraulic flow force (16) compressing the layers away from this ring or perhaps other reasons.

Thus, of the solutions found and reviewed, a need still exists for more effective sealing. The present invention fills this gap. While the needed implementing arts and elements have long been available, and a long felt need has existed, no invention appears to have accomplished the goals and objects of the present invention. Certainly, those in the field appreciated that a problem existed and that the problem involved leakage, but were unable to fully appreciate the solution to the problem. As seen above and in other areas, substantial attempts were made by those skilled in the art to fulfill the needs or to cope with the difficulties, but they either failed to appreciate the full scope of the problem or only provided a partial solution. Part of this realization may have been a failure to understand the real world complexities of producing satisfactory shaped filters of the quality needed, considering the expense involved. Thus, the present invention seeks to resolve these issues and provide a simple and economical apparatus and method.

III. SUMMARY OF INVENTION

The invention of the present patent is a practical invention. It realizes the real world inconsistencies of wound filter elements and leakage control. The present invention recognizes the need for proximately compressing interstitially the wound layers in the filter elements. For instance, other references generally relied on sealing the filter about the base of a collector or container in an axial direction by axial compression. The present invention may not rely, in some embodiments, on axial compression; it simply may utilize a compressed blocking area in the filter element. The present invention also recognizes the real world out-of-roundness that typical filter elements contain and adjusts accordingly, such that in some embodiments a compressed area is uniformly compressed about the circumference of the filter element. This invention also recognizes that it might be advantageous in forming this compressed area to engage the filter elements at different points at different periods. For instance, it may vary the height of interstitial rings to assist in the compression procedure. The present invention also recognizes the utility to proximately and interstitially locate at least two rings such that a compressed area is formed interstitially between the layers of the filter element (and in some instances assuring that it is formed interstitially). Furthermore, the present invention recognizes the utility for secondary and compression tapers which may appear separately or in combination with different heights and different engagement points of multiple rings to assist in securing a compressed area.

Thus, one goal of the present invention is to provide a method of filtering a fluid which typically could comprise the steps of accepting a flow of unfiltered fluid into a container such as a filtering container, flowing the unfiltered fluid in an unfiltered flow path in that container, blocking the flow of unfiltered fluid in a blocking area through some type of action on or of a filtering medium contained in the container, filtering the unfiltered fluid to produce a filtered fluid in some filtering area typically contained within the filtering medium where the filtering occurs on an opposite side of the blocking area from the unfiltered fluid, interposing at least a portion of the filtering medium between the blocking area and the unfiltered area, and allowing the filtered fluid to pass out of the container. An object of this goal could be to provide a blocking area having a compressive force exerted on it that is greater than a hydraulic flow force caused by the fluid to better effectuate a seal. Such a compressive force could be in a radial direction and could comprise a radial compressive force. Another object could be to block the flow by annularly uniformly compressing the blocking area. Another object of this goal could be to continuously compress the blocking area. Still another object could be to compress in a step-wise fashion the blocking area. Still another object could be to compress the blocking area in a non-linear fashion, which may or may not include in a parabolic fashion. Such blocking could occur through the use of at least two interstitial rings. The blocking area could have a height to thickness ratio of approximately one-hundred percent (100%) in that the engaged height of the blocking area through the use of interstitial rings compared to the thickness of the blocking area between the interstitial rings could be approximately a ratio of one. To assist in the engagement, the rings could have different heights that could interstitially engage the filter element at different heights to form the blocking area. Another object could include engaging a first ring before engaging a second ring interstitially to establish the blocking area. For instance, this could include engaging a secondary taper on a first ring, then engaging a secondary taper on a second ring, and then engaging a compression taper on the first ring. Alternatively, it could include engaging a secondary taper on the first ring, then engaging a compression taper on the first ring and then engaging a secondary taper on the second ring. Another alternative could include engaging a secondary taper on the first ring, then engaging a secondary taper on the second ring and then engaging a compression taper on the second ring. Other variations are possible. Another object could include establishing the blocking area by the interactive engagement of a first and second ring. The interactive engagement can be accomplished by the proximate location of the first and second ring. Such proximate location of the first and second ring can function interactively such that the blocking area is compressed where the blocking area is created to resist the leakage of unfiltered fluid. Likewise, this blocking area may form a discreet annular area around the filter element. In some cases, the blocking area could be approximately one-quarter inch thick.

Another goal of the present invention is to filter a fluid by accepting a flow of unfiltered fluid into a container where the container contains a filtering medium, flowing the unfiltered fluid in an unfiltered flow path in the container, engaging a first interstitial ring to the filtering medium, engaging a second interstitial ring which is proximate to the first interstitial ring, interposing at least a portion of the filtering medium between the first and second interstitial rings and the unfiltered fluid, filtering the fluid through the filtering medium so that the filtering occurs on the opposite side of each of the first and second interstitial rings with respect to the unfiltered fluid, and allowing the filtered fluid to pass out of the container. Thus, the invention may include a fluid holding container with an inlet and an outlet, an unfiltered flow path for unfiltered fluid, a filter element fluidicly connected to the container comprising a filtering medium, a first interstitial ring which may interstitially engage the filtering medium, and a second interstitial ring which may interstitially engage the filtering medium and may be proximate to the first interstitial ring. Similar to the other objects, the rings could have secondary and compression tapers at different relative heights for engagement at different points on the filtering medium, could have an average ring height to thickness ratio of approximately one-hundred percent (100%), could be approximately one-quarter inch thick, and could form continuously compressed blocking areas or uniformly compressed blocking areas.

Another goal of the present invention is to accept the flow of unfiltered fluid into a container, flow the unfiltered fluid in an unfiltered flow path in the container, assure the annular engagement of a uniform area of filtering medium in a uniform engaged area, filter the fluid in the filtering medium to produce a filtering fluid where the filtering occurs on an opposite side of the uniform engaged area from the unfiltered fluid, and allow the filtered fluid to pass out of the container. One object of this goal could include establishing a blocking area from the uniform engaged area. The blocking area could comprise a uniformly compressed blocking area. It could also include a ring compression force acting on the blocking area that is greater than a hydraulic flow force acting on the filter element.

Another goal of the present invention is to accept the flow of unfiltered fluid into a container flow the unfiltered fluid in an unfiltered path in the container, engage the filtering medium with the first interstitial ring having a first axial height, engage the filtering medium with a second interstitial ring at a second axial height which is different than the first axial height, filter the unfiltered fluid in a filtering medium, and allow a filtered fluid to pass out of the container.

Another goal of the present invention is to accept an unfiltered fluid into a container, flow the unfiltered fluid in an unfiltered path in the container, force the flow through a filtering medium which is substantially parallel to a filtering flow to produce a filtering fluid, force the unfiltered fluid through a restrictor element substantially transverse to the filtering flow, block the flow from flowing around at least one edge of the restrictor element, and allow the filtered fluid to pass out of the container. The object of this goal could include creating a pressure equalization across an end of the substantially parallel filtering medium using the restrictor element. Another object of this goal could include blocking the flow around an inner and an outer edge. Such blocking could occur from a lip having a curved section on the restrictor element.

Naturally, further goals and objects of the invention are disclosed throughout other areas of the specification and claims.

V. DETAILED DESCRIPTION OF THE PREFERRED EMBODIMENTS

The basic concepts of the present invention may be implemented in a variety of ways. It may involve the use of two or more interstitial rings; it may involve the intentional wasting of a portion of the filter element to create a compressed blocking area; it may also involve the use of different heights of rings to accomplish various goals and objects of the present invention and may include the use of compression and secondary tapers on the rings. Furthermore, various aspects mentioned above may be applicable to a variety of devices and where applicable could include single element filters, multiple element filters, fluidic filtering systems (which could include gases or liquids) and may include filtering systems in different industries. It involves both methods and devices to accomplish the appropriate method. In this patent, the methods are disclosed as part of the results shown to be achieved by the various devices described and as steps that are inherent to utilization of the invention. They may be simply the natural result of utilizing the devices intended and described. In addition, while some devices are disclosed, it would be understood that these not only accomplish certain methods, but also can be varied in a number of ways. Importantly, as to the foregoing, all of these facets should be understood to be encompassed by this patent.

Figure 4:
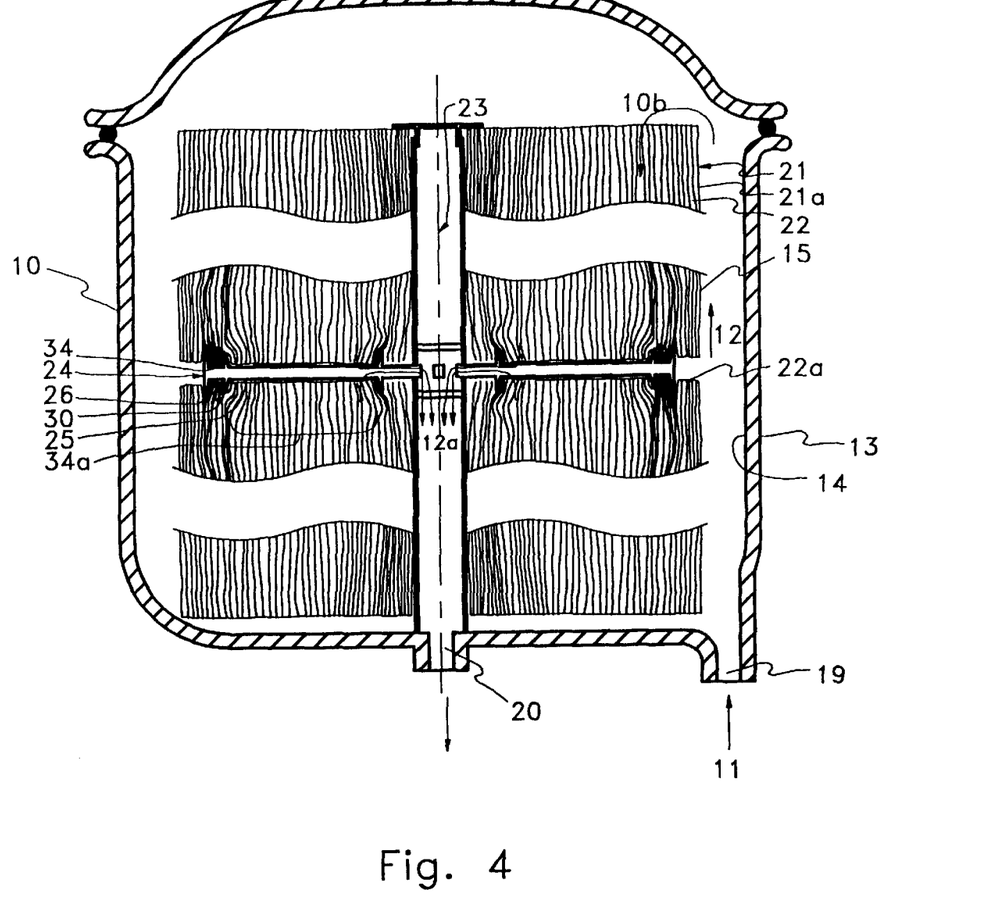
FIG. 4 represents a cross section of relevant aspects of the present invention.

Having described FIGS. 1–3 above and the various prior attempts to solve the problems, reference is now directed to FIG. 4. In FIG. 4, a fluid filter (10) is shown. This fluid filter typically may be pressurized in use and has an axial flow (10b) through the filter element (22). The fluid (11) enters the inlet port (19) as shown. It then may flow along the outer periphery of the filter assembly collectively shown as (21) which may be comprised of various filter elements such as (21a). The unfiltered fluid may flow in the unfiltered flow path (12) until reaching a return point and flowing in the axial flow path (10b) in the filter element (21a). As the fluid flows between the interstitial wound layers of tissue (22), impurities are trapped against the surfaces of the tissue. As fluid flows axially, it may enter the fluid collector element (24), travel toward the inner core (23), and enter the filtered flow path (12a). The filtered fluid then may exit the outlet port (20) into the rest of the fluidic system. Naturally, if only a single element (21a) were used, then the fluid collector element (24) could be integral to the fluid container (13) or could be a separate element as shown perhaps in FIG. 5. Also, if multiple pairs of filter elements (21a) were used as part of the filter assembly (21), then more fluid collector elements (24) would generally be used.

The fluid collector element (24) as shown in FIG. 4 may include a substantially flat portion (25). The substantially flat portion generally may have two sides and at least one of which may be adapted to face the filter element (21a). In the illustration of FIG. 4, both sides appear to be adapted to face each filter element (21a). Either separate or integral to the substantially flat portion (25) may be a first ring (26) and perhaps a second ring (30). The rings are described in more detail in FIG. 5 below. One novel aspect of the present invention is that both rings may be interstitially oriented to the filter element (21a) and may interstitially engage the wound layers of tissue (22). It is believed that by interstitially engaging with at least two rings, at least two events may occur. First, a blocking area may be created between the two rings. This blocking area may be compressed between the two rings. By blocking, it is not meant to be absolute in the sense of no leakage; it is meant to achieve a substantial blocking of unfiltered fluid leaking through a leakage channel (18a). Thus, filtering could occur on at least a portion of the filtering medium on an opposite side (34a) of the blocking area (34) from the unfiltered fluid in the unfiltered flow path (12). The blocking area may be uniformly compressed in that both rings are interstitial and, thus, any manufacturing tolerances that might produce an out-of-shape element may be accounted for. A second event may occur in that an outer ring, by being interstitial, may allow a portion of the filtering medium to be interposed between the blocking area and the unfiltered fluid in the unfiltered flow path (12).

Figure 5:
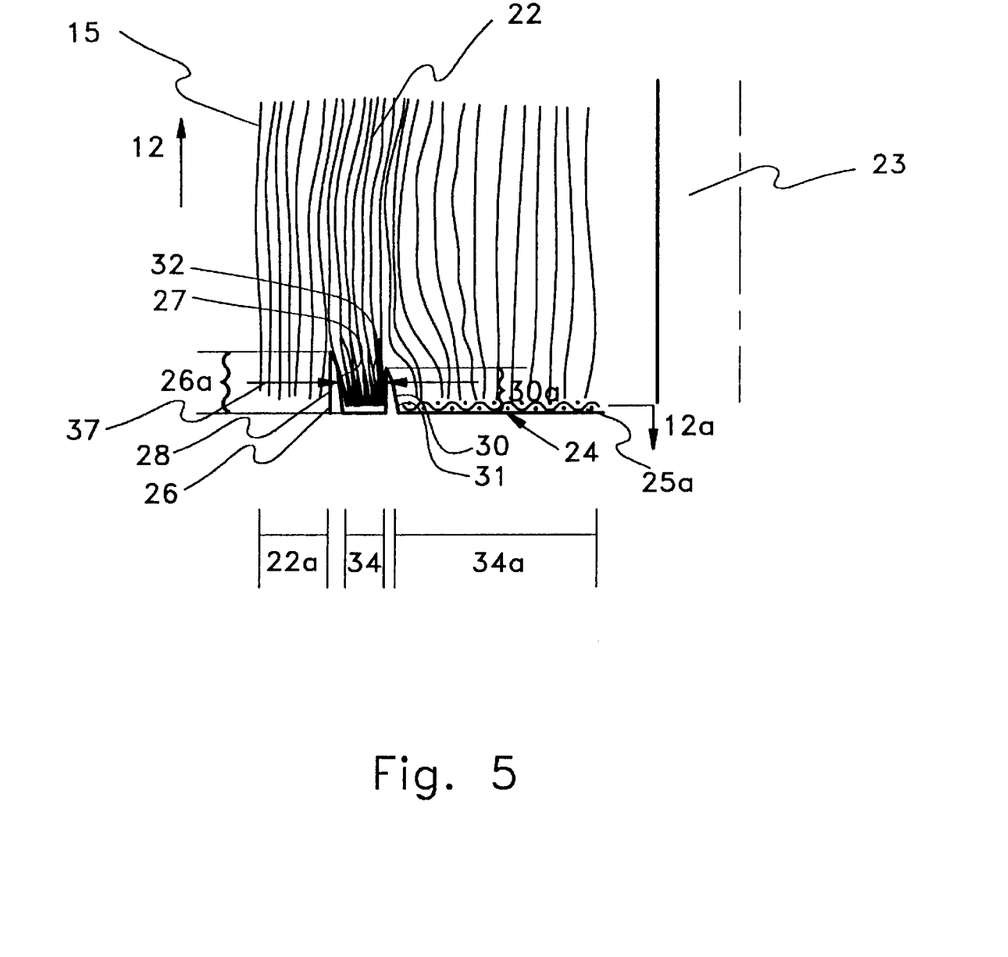
FIG. 5 represents a detail of the compressed area between rings.

Referring to FIG. 5, more detail may be seen of at least one aspect of the present invention. The fluid collector element (24) is shown in at least two pieces and may include a wire screen (25a) or other separate member and a substantially flat portion (25) having two sides, at least one of which may be adapted to face the filter element and may include a first ring (26) and a second ring (30). The embodiment shown is certainly not restrictive. For instance, the embodiment may include a one-piece arrangement, shown in FIG. 5a. What is important, at least in one aspect, is that the rings form a blocking area. In the preferred embodiment, it appears that approximately one-quarter inch thick section of the wound layers of tissue may be appropriate for some applications. The blocking area may be interstitial in that an interposed portion (22a) exists between the unfiltered flow path (12) and the blocking area (34).

This blocking area may be interactively established by the interaction of the first ring (26) and the second ring (30). The first ring and the second ring are described in more detail in FIG. 6. For effective sealing, it may be advantageous to have a continuously compressed blocking area. The first ring may have a first ring height (26a). The second ring may have a second ring height (30a). An average of the two heights compared to the thickness of the compressed blocking area in the preferred embodiment may approximate a one-to-one ratio, i.e., one-hundred percent (100%). This novel aspect of the present invention differs from prior efforts that most efforts relied upon axially, not radially, compressing the fibers to overcome leakage along the leakage channel (18a) shown in FIGS. 2 and 3. The present invention seeks to overcome this leakage problem by providing a blocking area between, for instance, the two rings shown. Obviously, other blocking area arrangements could be made. It is envisioned that some action on the filtering medium, such as pre-compressing a portion of the wound tissues, will be useful for creating the blocking area. Once the blocking area is created, then the filtering medium could block the leakage by action of the filtering medium. The blocking area shown in FIG. 5 may have a radial compression component in terms of a pre-compressed state between the two rings before filtering occurs in the filter element. By pre-compressing a defined interstitial area radially, it is believed that less dependence upon axial compression is required in blocking the leakage channel (18a) such as shown in FIGS. 2 and 3. This aspect, novel to the present invention, sacrifices a portion of the filtering medium in its efficiency by intentionally not using a portion of the filter to create a blocking area in order to secure better purity and avoid less leakage.

To assure a suitable blocking area, the first ring may be located a few layers in from the outer periphery of the filter element to form an interposed section (22a) of a filtering medium wound layers of tissue (22), shown in FIG. 5. This may insure more uniformity to the blocking area. In such an instance, filtering could occur on an opposite side (34a) of both the first and second rings from unfiltered fluid. Naturally, the order of the first ring and second ring could be switched so that the second ring is to the outside of the first ring for the purposes of this disclosure and the goals and objects of the invention. By interposing a section, some advantages may result. First, it may be assured that a blocking area is formed between the two rings (26) and (30). By interposing such a section, it may be assured that the blocking area (34) forms a discreet annular area that may be uniformly compressed. This may reduce the problems discussed related to FIG. 1 in which, because of manufacturing real world tolerances, it may not necessarily follow that an equal amount of wound tissue fibers are compressed around the entire blocking area. By interactively using the first and second ring, or taking some action on the filtering medium such as squeezing the filtering medium between the rings, a ring compression force (37) may be formed and may compress the blocking area. In some instances, it may be such that the ring compression force is greater than the hydraulic flow force discussed in FIGS. 2 and 3, so that the hydraulic flow force does not displace the filtering medium and so that leakage through the leakage channel (18a) of FIGS. 2 and 3 is reduced or eliminated. This may enable the filter to achieve higher purity in reducing the filtered fluid contamination due to the leakage channel (18a).

The first ring, as shown in FIG. 5, may be an outer ring, although, other configurations are possible. It may extend axially from the flat portion (25) of the fluid collector element (24) and may not necessarily be perpendicular to that flat portion. Similarly, the second ring (30) may be interstitial; it may extend axially from the flat portion (25) of the fluid collector element (24) and need not be perpendicular to the flat portion of the collector. In the preferred embodiment, the second ring (30) may be proximate to the first ring (26). While in the preferred embodiment, this proximate distance may be approximately one-quarter inch, other distances may be possible such that proximate is intended to include all distances by which the goals of forming a blocking area are accomplished. As shown in FIG.

5, the first ring (26) may have a first ring height (26a) that may be greater than the second ring height (30a). Similarly, other rings may be formed, either integral to or separate from the fluid collector element (24). For instance, an inner ring (shown in FIG. 5a), could be formed in the fluid collector closer to the inner core (23) that could perform other functions. Typically, this inner ring may not be proximate to the first or second ring because it may not be advantageous to create another blocking area over an extended thickness of the filter element and further reduce the efficiency of the filter element (21a).

To assist in forming the blocking area, each ring may have at least one taper. These tapers may be formed on the inner surface (31) of the second ring (30) or outer surface (32) of the ring. For the purposes of the present invention, the inner surface is defined as the surface facing the inner core (23) and the outer surface (32) is defined as the surface facing the outer periphery of the filter element (21a). The first ring (26) would similarly have an inner surface (27) and an outer surface (28). Furthermore, by interactively establishing a blocking area, the blocking area may form a discreet annular area, shown in FIG. 7 described below. This discreet annular area may be annularly uniform in that a uniform amount of material may be used to create a blocking area around an annulus of a cross section of the filter element (21a). By annular, it is meant to include all shapes of elements such as round, oblong, square, and other geometric shapes.

Figure 5A:
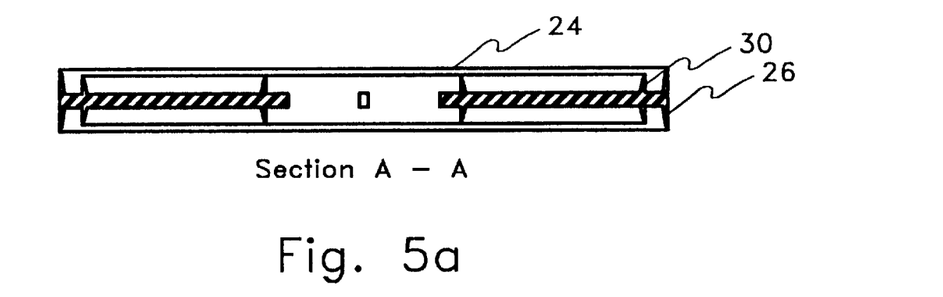
FIG. 5a represents a cross section of another embodiment to show an integral fluid collector designed to engage a pair of filter elements.
Figure 5B:
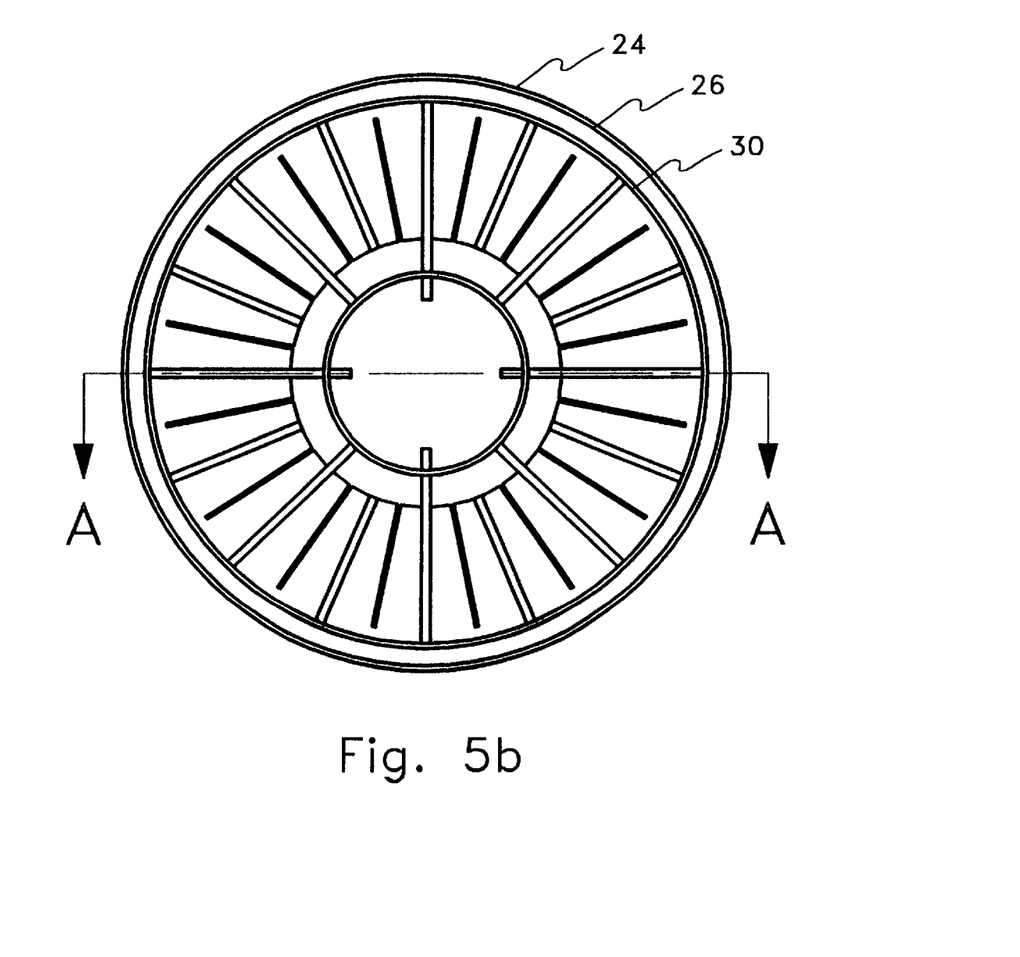

FIG. 5a shows another embodiment of the present invention representing an integral molded assembly including the first and second ring and an inner ring which may be molded to the fluid collector (24). FIG. 5b shows a plan view of this embodiment. Fluid collector elements, other then the goals and objects of the present invention, are known to those in the art and would include such devices as the Rasmussen '397 reference, the Rasmussen '204 reference, and the McGinness '290 reference disclosed above and assigned to Harvard Corporation of Evansville, Wis. The embodiment with an inner ring (here a third ring) may offer additional benefits in using a restrictor element described in more detail below in FIG. 10.

Figure 6:
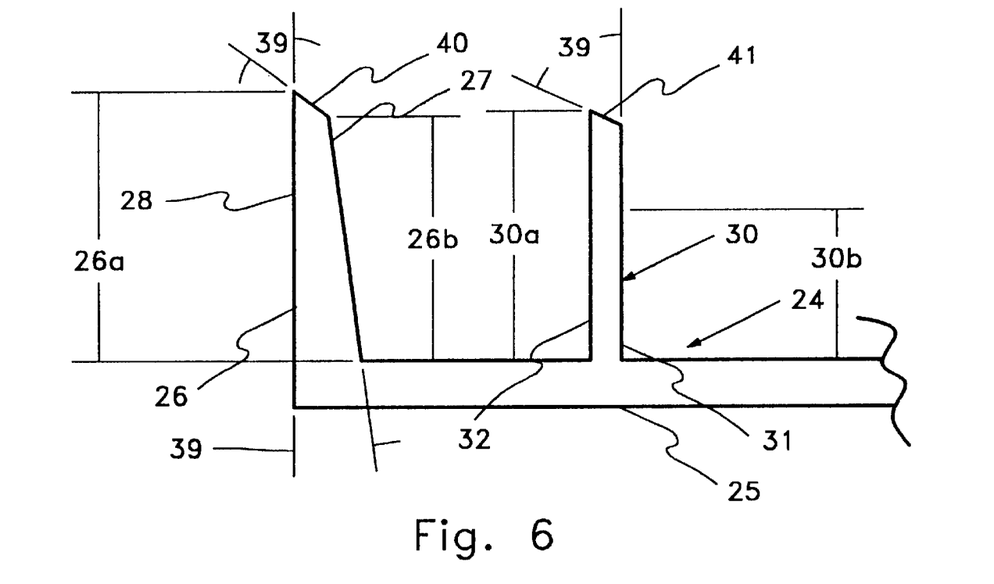
FIG. 6 represents a detail of the secondary and compression tapers of the rings.

To further clarify the tapers on the inner and outer surfaces, reference is now made to FIG. 6. The fluid collector element (24) may comprise a substantially flat portion (25) with at least one side adapted to face a filter element. The side adapted to face the filter element may contain two rings as disclosed above. The first ring (26) may have a substantially perpendicular outer surface (28) with respect to the substantially flat portion (25). The inner surface (27) of the first ring (26) may include a compression taper (39). As shown in FIG. 6, this compression taper may face the second ring (30). Toward the upper portion of the first ring (26), a second taper described as a secondary taper (40) on the first ring may appear. The secondary taper on the first ring may be sharp and may engage the filter wound layers of tissue (22). As could be recognized by one skilled in the art, as the first ring progressively engages interstitially the wound layers of tissue, the layers typically first engage the secondary taper (40). Then, as the layers engage the compression taper (39), the entrapped wound layers of tissue could be forced or compressed against the secondary ring (30) and its outer surface (32) to create a ring compression force. In such an embodiment as shown in FIG. 6, different heights of the first ring may be appropriate compared to different heights of the second ring. For instance, the first ring height (26a) may be higher than the second ring height (30a). This may assist in engaging the wound layers of tissue first with the first ring (26) with a secondary taper (40) at a first ring height (26a), then engaging the second ring (30) at its second ring height (30a), and then engaging the compression taper (39) on the first ring, so that the wound layers of tissue are entrapped and can be compressed between the compression taper (39) on the first ring and the outer surface (32) on the second ring (30).

Typically, the wound filter elements are flat on their ends. Thus, by changing the heights of the various tapers on each or both rings, the order in engagement can be altered. Naturally, if the ends of the wound layers of tissue were not flat, then the order of engagement could also be varied through that means. Thus, the heights, as described herein, should be understood to encompass a relative order of engagement and not necessarily a fixed height with relationship to each ring.

Obviously, other variations of engagement are possible, some of which will be described below. It may be useful to also include a secondary taper (41) on the second ring (30) to assist in interstitially engaging the wound layers of tissue. The compression taper height (26b) on the first ring (26) may be higher or lower than the second ring height (30a) or the compression taper height (30b) on the second ring (30) depending on the order of engagement desired.

Figure 7:
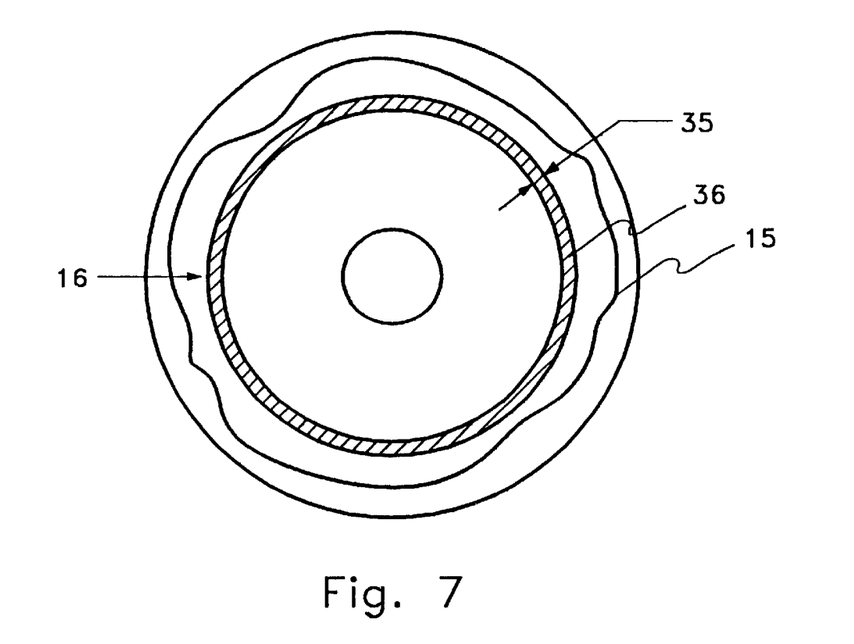
FIG. 7 represents a cross sectional and area showing a discreet annular area within the filter element.

While the creation or compression of a blocking area has been described in terms of a combination or an interactive combination of a first and second ring, more generally, this feature may be referred to as a uniform compression element which could include sub-elements such as the first and second rings. Other embodiments of a uniform compression element may occur. A key for a uniform compression element is to assure that a uniform amount of tissue layers are engaged even when the periphery of the wound filter element (21a) may be out of shape. One approach for achieving a more "uniform" amount is to begin the engagement of the tissue layers interstitially at least a few layers from the periphery and the locate the annular area entirely interstitially. This is illustrated in FIG. 7 where the discreet annular area (36) may be an annularly uniform amount. By the term "assure", it is meant to include a high probability of creating, in this case, a uniform area of engagement. Similarly, a uniform compression element could increasingly compress as it engages the wound tissues. As described below, this compression may be continuous, linear, stepwise, or other appropriate modes. Also, it may be non-linear such as would accompany a curved compression taper and could include parabolic shapes and other combinations.

Figure 8:
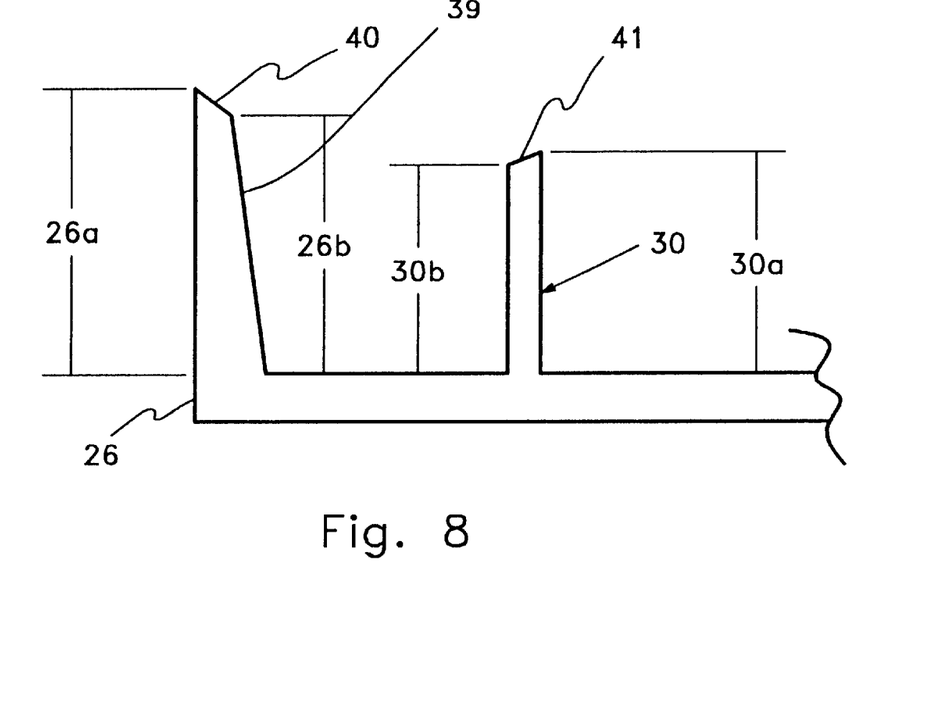
FIG. 8 represents another variation of the secondary and compression tapers.

FIG. 8 shows at least one alternative of the engagement ring heights. In FIG. 8, (assuming a flat end of the filter element (21a)), the engagement order could be as follows: first, the filter element might engage the secondary taper (40) on the first ring (26), then engage the compression taper (39) on the first ring with a height (26b), then engage the secondary taper (41) on the second ring (30) with a height (30a). Thus, the first ring height (26a) would be higher than the compression taper height (26b) which in turn would be higher than the second ring height (30a) on the second ring (30). FIG. 8 also changes (as an example of variations possible) the orientation of the secondary taper (41) which faces the first ring (26), compared to FIG. 6. Various combinations could be made such as may be dictated by manufacturing concerns, economy, and efficiency. FIG. 8 shows a somewhat linear compression taper (39). Thus, upon engagement, the embodiment of FIG. 8 may allow for continuously compressing the filter element between the first ring and the second ring. This compression may occur in a somewhat linear fashion, although certainly other configurations are possible.

Figure 8A:
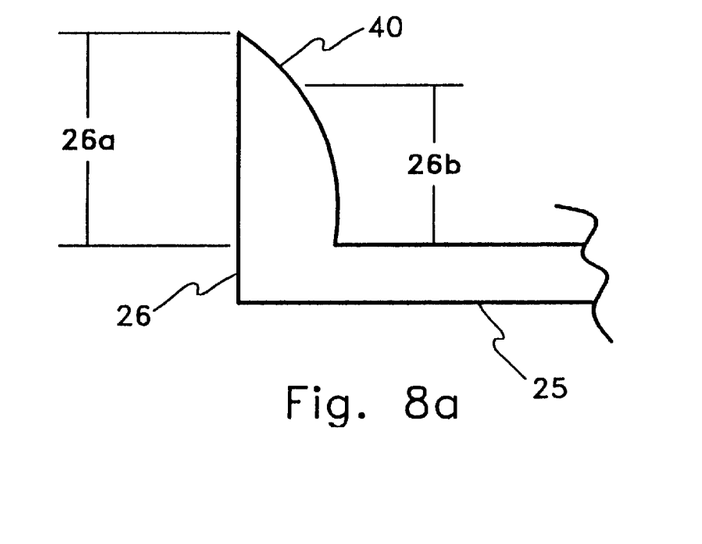
FIG. 8a is another embodiment of a cross section of rings.

FIG. 8a shows another configuration of the cross section of compression and secondary tapers. In FIG. 8a (as well as in FIGS. 8b and 8c), the compression taper is shown on the first ring; however, it could be placed on the second ring (and other rings) as well (Such as shown in FIG. 8d). Therefore, any discussion in this patent regarding the first ring and its configuration may be applicable to the second ring. In FIG. 8a, the secondary taper (40) may terminate at a height (26b) from the flat portion (25). From that point to the flat portion (25), the compression taper may be non-linear. This may, for instance, offer a rate of compression that would be greater at the beginning of the engagement and taper off toward the end of the engagement.

Figure 8B:
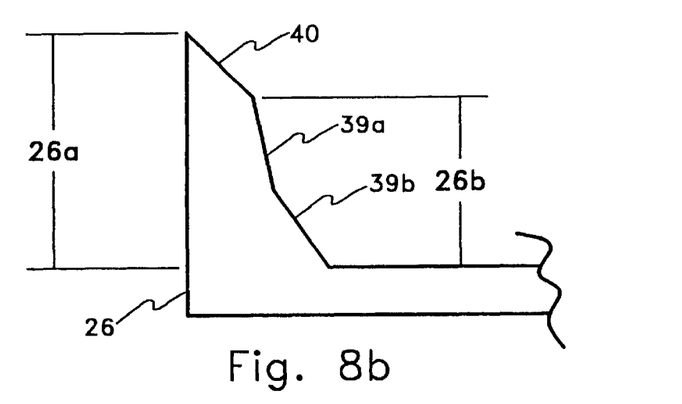
FIG. 8b is another embodiment of a cross section of rings.

FIG. 8b shows a step-wise compression taper that starts at a height (26b) at the lower end of the secondary taper (40). A first step (39a) may offer a decreased rate of compression compared to the second step (39b). Obviously, single or multiple steps could be used.

Figure 8C:
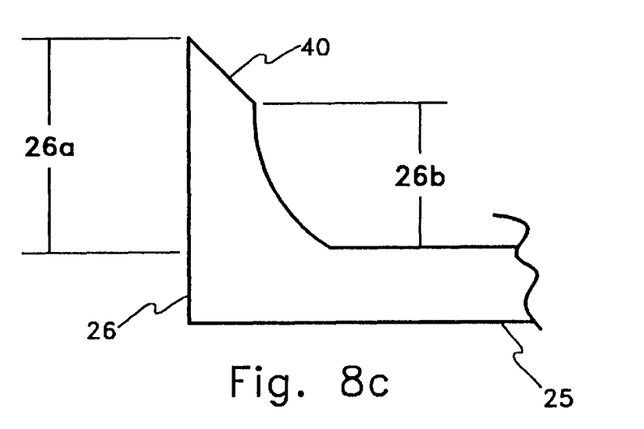
FIG. 8c is another embodiment of a cross section of rings.
Figure 8D:
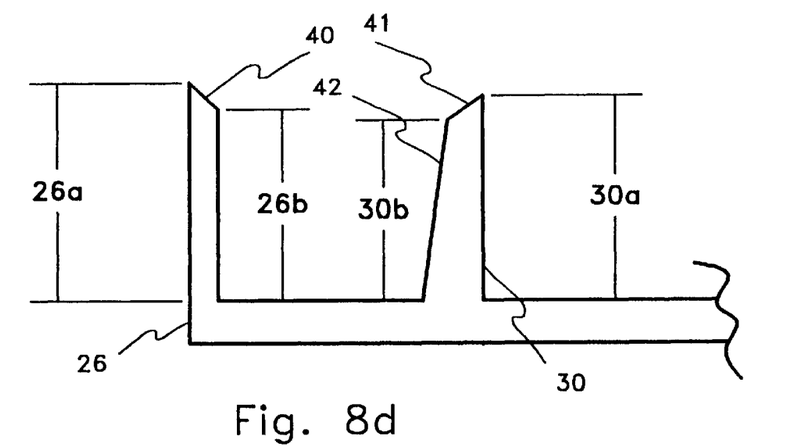
FIG. 8d is another embodiment of a cross section of rings.

FIG. 8c shows still another configuration of the compression taper beginning at height (26b) from the flat portion (25). This taper may be non-linear similar to the taper of FIG. 8a but offer an inverse relationship compared to FIG. 8a. Obviously, it could vary from such a relationship. It may be non-linear or it may be parabolic in that the resulting forces applied to the blocking area, as the ring engages the wound tissue, may be non-linearly or parabolically increased as the engagement continues to terminate at the flat portion (25).

FIG. 8d shows yet another alternative. In that embodiment, the first ring height (26a) at the tip of a secondary taper on the first ring (26) might be higher than the second ring height (30a) on the second ring (30) which in turn might be higher than the lower end of the secondary taper at (26b) of the first ring (26), which in turn might be higher than the compression taper height (30b) on the second ring. Thus, in this embodiment, the compression taper would be part of the second ring to compress toward the first ring.

As can be seen, various embodiments are possible depending on whether the compression is performed by the first ring or second ring, depending on whether the blocking area is formed by a compression taper on the first ring or the second ring, or depending on which ring is engaged first and which taper is engaged. The above embodiments are simply illustrative of various aspects of engaging a discreet portion between two rings which generally may include compressing the discreet portion along a compression taper.

The compression taper in the preferred embodiment may be at an angle of approximately six degrees. The secondary taper may be at an angle of approximately twenty-five to thirty degrees. Obviously, other variations are possible. In the preferred embodiment, it has observed seen that the first ring height (26a) may be approximately 0.28 inches high, the second ring height (30a) may be approximately 0.21 inches high with an average height of approximately 0.25 inches. The thickness of each ring may be approximately 0.06 inches thick. If a proximate distance between the rings was approximately 0.25 inches, then the average ring height to thickness ratio of the blocking area would approximately be one-hundred percent or a 1:1 ratio. While the preferred embodiment may have different ring heights, certainly it would be possible for the rings to have the same heights and still meet with various goals and objects of the present invention. Likewise, the different compression tapers and secondary tapers could be located on the outer surfaces or inner surfaces of each ring, as might be dictated by various concerns to establish a blocking area.

Figure 9:
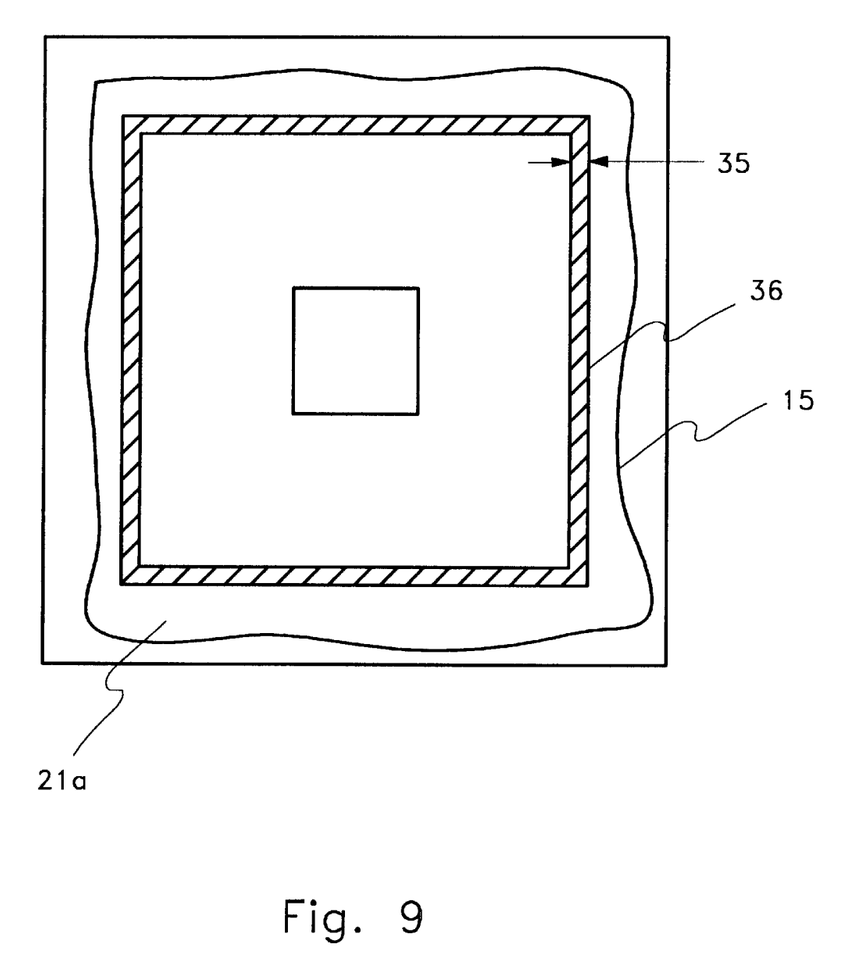
FIG. 9 represents a cross section of a different configuration of the filter element (21a) but in other aspects corresponds to FIG. 7.

Referring to FIG. 9, the present invention is not restricted to a circular wound element. For instance, it may be comprised of a square, rectangular, oval, or other shaped wound filter element as may be desired. The market place and competitive efficiencies may dictate the particular shape. However, the goals and objects of the present invention may be met accordingly, for instance, by providing a blocked area for sealing against the leakage of unfiltered fluid into filtered fluid, or by providing interstitial rings, or other goals and objects of the present invention. FIG. 9 has, similar to FIG. 7, a cross sectional view showing the blocking area as a discreet annular area (36) having a thickness (35) which may be formed interstitially from the outer periphery of the filter element (15) on the filter element (21a).

Figure 10:
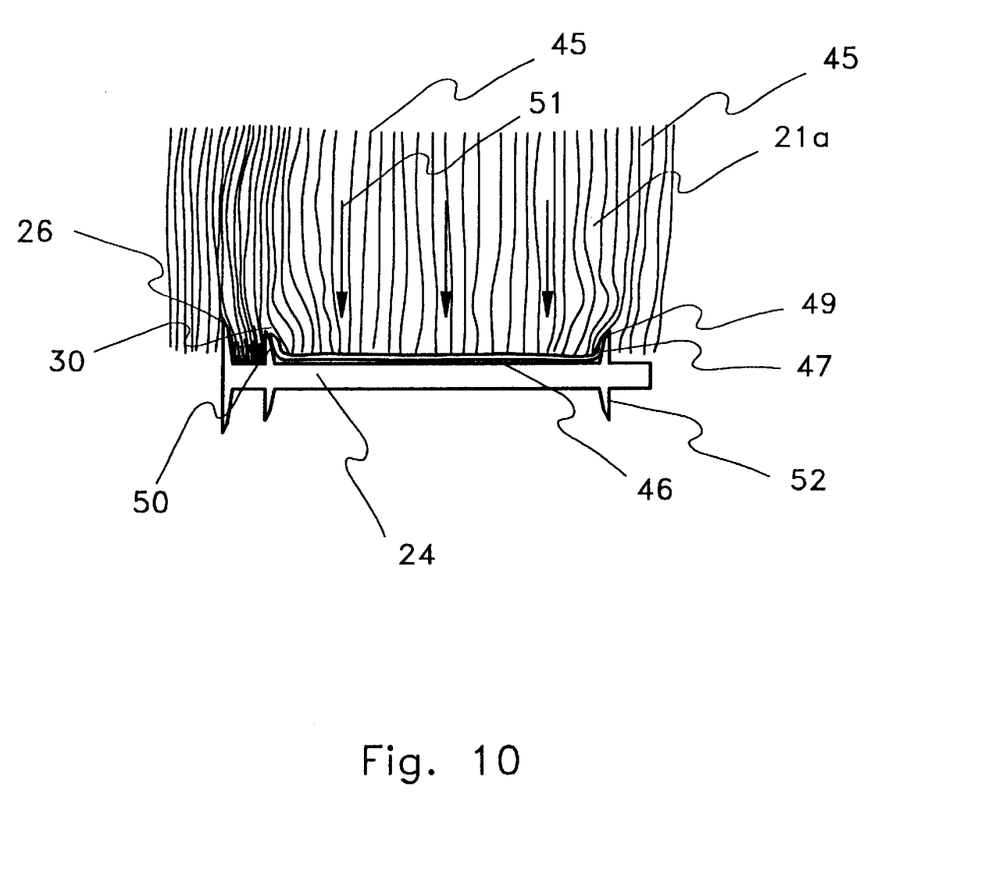
FIG. 10 represents a use of a transverse restrictor element that may equalize the pressure across a cross sectional area of the substantially parallel filtering medium and may seal at least one edge.

FIG. 10 shows another aspect of the present invention. In FIG. 10, the filtering element is designated (45) which is nominated a substantially parallel filtering medium and is substantially parallel with respect to the filtering flow path (45a). This may include the type of wound layers of tissue type elements described above and nominated as filter (21a) element. The flow through the filter assembly (21), and typically through the substantially parallel filtering medium (45) in an axial flow direction, may cause channeling within the wound layers of tissues themselves. Once the channel or separation between the wound layers of tissue occurs, less filtration may be possible. Thus, it may be advantageous to include a restrictor element (46) to deter unfiltered fluid from contaminating filtered fluid due to channeling. This restrictor element may also attempt to better equalize the pressure across a cross sectional area of the filter element (45) to lessen the risk of channeling.

The substantially transverse restrictor element (46) typically is perpendicular with respect to the filtering flow path (45a). By "transverse" it is meant to include an alignment at any angle transverse to the primary axial flow of filtration. Typically, the restrictor element (46) may be made of material of greater porosity than the filtering element (21a) such that the flow is not unduly hindered, yet assistive in reducing channeling. Additionally, one novel aspect of the present invention helps seal around the edge of the restrictor element (46) such that the unfiltered flow does not bypass or at least is reduced.

Unique to the present invention, it incorporates, at least on one side, a lip (47) that rolls toward the filtering tissues (21a). This may be used in conjunction with an inner ring (52) (here a third ring) on the inner surfaces and perhaps a second ring (30) on the outer surfaces. The inner ring may be interstitial. Obviously, other combinations are possible. With the lip (47) shown protruding upwards toward the filter element (45a), the pressure (51) from the fluid flow helps seal the lip against the ring and therefore seal between the interstitial wound layers of tissues, thus reducing leakage between the restrictor element 46 and the end of the filter element (21a) into the filtered flow path. Obviously, both edges of the substantially transverse restrictor element (46) could have a lip, shown on the inner edge (49) and the outer edge (50). Thus, by using this device, the pressure may be more equalized and inhibit channeling and perhaps prolong the life of the filtering element by distributing the filtration across the substantially parallel filtering medium (45). This invention, by inclusion of the lip in conjunction with the rings in at least one embodiment, may also reduce the leakage across this restrictor element.

Each of these pressurized axial flow fluid filters could include various facets of the present invention. Some may include a blocking area, others may include interstitial rings, and still others may include combinations of both. Some may include varieties of restrictor elements, depending on the particular desires and concerns. The market place and manufacturing concerns may dictate the appropriate embodiments for the present invention.

The foregoing discussion and the claims that follow describe only the preferred embodiments of the present invention. Particularly with respect to the claims, it should be understood that a number of changes may be made without departing from the essence of the present invention. In this regard, it is intended that such changes—to the extent that they substantially achieve the same results in substantially the same way—will still fall within the scope of the present invention. It is simply not practical to describe in the claims all the possible embodiments to the present invention which may be accomplished generally in keeping with the goals and objects of the present invention and, thus, disclosure which may include, separately and collectively, such aspects as blocking the flow of unfiltered fluid in a blocking area, interposing a portion of the filtering medium between a blocking area and the unfiltered fluid, compressing the blocking area, engaging a first interstitial ring and a second interstitial ring within the wound layers of tissue, assuring the annular engagement of a uniform area of filtering medium, engaging filtering medium with interstitial rings having different axial heights, and forcing flow through a restrictor element with a lip, and forcing flow through a substantially parallel filtering medium within the same filtering assembly, or others. These aspects, separately or in various combinations, may be included in each of the claims. To the extent the methods claimed in the present invention are not further discussed, they are natural outgrowths of the system or apparatus claimed. Therefore, separate and further discussion of the methods are deemed unnecessary as they otherwise claim steps that are implicit in the use and manufacture of the system or the apparatus claims. Without limitation, the present disclosure should be construed to encompass subclaims similar to those presented in each of system, apparatus, or method claims that could be applicable to the other system, apparatus, or method claims. Furthermore, the steps are organized in a more logical fashion; however, other sequences can and do occur. Therefore, the method claims should not be construed to include only the order of sequence and steps presented.

As mentioned earlier, this invention can be embodied in a variety of ways. In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "blocking area" should be understood to encompass disclosure of the act of "blocking"—whether explicitly discussed or not—and, conversely, were there only disclosure of the act of "blocking", such a disclosure should be understood to encompass disclosure of a "block" or "blocking area." Such changes and alternative terms are to be understood to be explicitly included in the description.

Furthermore, any references mentioned in the application or this patent, as well as all references listed in any information disclosure originally filed with the application, are hereby incorporated by reference in their entirety to the extent such may be deemed essential to support the enablement of the invention(s). However, to the extent statements may be considered inconsistent with the patenting of this/these invention(s), such statements are expressly not to be considered as made by the applicant(s).

What is claimed is:

1. A pressurized axial flow fluid filter comprising:
    a. a fluid holding container with an inlet and an outlet;
    b. a filter element within said container comprising a filtering medium to filter an unfiltered fluid;
    c. a filtered flow path in said filter element;
    d. a blocking area to separate said filtered flow path from said unfiltered fluid in said container; and
    e. an interposed portion of said filtering medium between said blocking area and said unfiltered fluid.

2. A pressurized axial flow fluid filter as described in claim 1 wherein said blocking area is interactively established by a first and second ring.

3. A pressurized axial flow fluid filter as described in claim 2 wherein said blocking area has an average ring height to thickness ratio of approximately 100%.

4. A pressurized axial flow fluid filter as described in claim 2 wherein said first and second rings have different heights.

5. A pressurized axial flow fluid filter as described in claim 1 wherein said blocking area comprises a discrete annular area within said filter element wherein a ring compression force formed by an interaction of said first ring and said second ring on said blocking area is greater than a hydraulic flow force on said filter element.

6. A pressurized axial flow fluid filter as described in claim 1 wherein said blocking area comprises an annularly uniform compressed blocking area.

7. A pressurized axial flow fluid filter as described in claim 1 wherein said blocking area comprises a continuously compressed blocking area.

8. A pressurized axial flow fluid filter as described in claim 1 wherein said blocking area comprises a step-wise compressed blocking area.

9. A pressurized axial flow fluid filter as described in claim 1 wherein said blocking area comprises a non-linearly compressed blocking area.

10. A pressurized axial flow fluid filter as described in claim 1 wherein said blocking area comprises a parabolically compressed blocking area.

11. A pressurized axial flow fluid filter as described in claim 1 wherein said blocking area is approximately one quarter inch thick.

12. A pressurized axial flow fluid filter as described in claim 1 wherein said first ring has a secondary taper higher than a secondary taper on said second ring and wherein said secondary taper on said second ring is higher than a compression taper on said first ring.

13. A pressurized axial flow fluid filter as described in claim 1 wherein said first ring has a secondary taper higher than a secondary taper on said second ring and wherein a compression taper on said first ring is higher than said secondary taper on said second ring.

14. A pressurized axial flow fluid filter as described in claim 1 wherein said first ring has a secondary taper higher than a secondary taper on said second ring and wherein a compression taper on said second ring is higher than a compression taper on said first ring.

15. A pressurized axial flow fluid filter as described in claim 12, 13, or 14 wherein said secondary and compression tapers on said first ring face said second ring.

16. A pressurized axial flow fluid filter as described in claim 4 wherein said first ring comprises an outer concentric ring having a greater height than said second ring.

17. A pressurized axial flow fluid filter comprising:
   a. a fluid holding container with an inlet and an outlet;
   b. an unfiltered flow path containing unfiltered fluid;
   c. a filter element within to said container comprising a filtering medium to filter said unfiltered fluid;
   d. a first interstitial ring which interstitially engages said filtering medium;
   e. a second interstitial ring which interstitially engages said filtering medium and is proximate to said first interstitial ring.

18. A pressurized axial flow fluid filter as described in claim 17 further comprising a blocking area established between said first interstitial ring and said second interstitial ring.

19. A pressurized axial flow fluid filter as described in claim 18 wherein said blocking area comprises a uniformly compressed blocking area the interaction between said first interstitial ring and said second interstitial ring.

20. A pressurized axial flow fluid filter as described in claim 18 wherein said blocking area comprises a continuously compressed blocking area the interaction between said first interstitial ring and said second interstitial ring.

21. A pressurized axial flow fluid filter as described in claim 18 wherein said blocking area is approximately one quarter inch thick.

22. A pressurized axial flow fluid filter as described in claim 18 wherein said blocking area comprises an average ring height to thickness ratio of approximately 100%.

23. A pressurized axial flow fluid filter as described in claim 17 wherein said rings have different heights.

24. A pressurized axial flow fluid filter as described in claim 23 wherein said first ring has a secondary taper higher than a secondary taper on said second ring and wherein said secondary taper on said second ring is higher than a compression taper on said first ring.

25. A pressurized axial flow fluid filter as described in claim 23 wherein said first ring has a secondary taper higher than a secondary taper on said second ring and wherein a compression taper on said first ring is higher than said secondary taper on said second ring.

26. A pressurized axial flow fluid filter as described in claim 23 wherein said first ring has a secondary taper higher than a secondary taper on said second ring and wherein a compression taper on said second ring is higher than a compression taper on said first ring.

27. A pressurized axial flow fluid filter as described in claim 24, 25, or 26 wherein said secondary and compression tapers on said first ring face said second ring.

28. A pressurized axial flow fluid filter as described in claim 27 wherein said first ring comprises an outer ring.

29. A pressurized axial flow fluid filter comprising:
   a. a fluid holding container into which an unfiltered fluid flows in a flow path wherein said container comprises an inlet and an outlet;
   b. a filter element within said container comprising a filtering medium;
   c. an uniform engaged area comprising an annular engagement of a uniform portion of said filtering medium, wherein said uniform engaged area comprises a blocking area; and
   d. a filtering area located on an opposite side of said uniform engaged area from said unfiltered fluid wherein said filtering area filters said unfiltered fluid to produce a filtered fluid which exits said container through said outlet.

30. A pressurized axial flow fluid filter as described in claim 29 wherein said blocking area comprises a uniformly compressed blocking area.

31. A pressurized axial flow fluid filter as described in claim 29 wherein a radial compressive force acting on said blocking area is greater than a hydraulic flow force acting on said filtering medium.

32. A pressurized axial flow fluid filter as described in claim 29 wherein said blocking area is approximately one quarter inch thick.

33. A pressurized axial flow fluid filter as described in claim 29 wherein said blocking area is created by an interaction of a first ring and a second ring.

34. A pressurized axial flow fluid filter as described in claim 33 wherein said blocking area has a average ring height to thickness ratio of approximately 100%.

35. A pressurized axial flow fluid filter as described in claim 33 wherein said rings have different heights.

36. A pressurized axial flow fluid filter as described in claim 35 wherein said first ring has a secondary taper higher than a secondary taper on said second ring and wherein said secondary taper on said second ring is higher than a compression taper on said first ring.

37. A pressurized axial flow fluid filter as described in claim 35 wherein said first ring has a secondary taper higher than a secondary taper on said second ring and wherein a compression taper on said first ring is higher than said secondary taper on said second ring.

38. A pressurized axial flow fluid filter as described in claim 35 wherein said first ring has a secondary taper higher than a secondary taper on said second ring and wherein a compression taper on said second ring is higher than a compression taper on said first ring.

39. A pressurized axial flow fluid filter as described in claim 36, 37, or 38 wherein said secondary and compression tapers on said first ring face said second ring.

40. A pressurized axial flow fluid filter as described in claim 39 wherein said first ring comprises an outer ring.

41. A pressurized axial flow fluid filter comprising:
   a. a fluid holding container through which a fluid flows in a flow path wherein said container comprises an inlet and an outlet;
   b. a filter element within said container comprising a filtering medium to filter said fluid;
   c. a first interstitial ring which engages said filtering medium and comprises a first axial height; and
   d. a second interstitial ring which engages said filtering medium and comprises a second axial height which is different from said first axial height.

42. A pressurized axial flow fluid filter as described in claim 41 further comprising a blocking area situated between said first interstitial ring and said second interstitial ring.

43. A pressurized axial flow fluid filter as described in claim 42 wherein said blocking area comprises a discrete annular area within said filter element wherein a ring compression force formed by an interaction of said first interstitial ring and said second interstitial ring on said blocking area is greater than a hydraulic flow force on said filter element.

44. A pressurized axial flow fluid filter as described in claim 42 wherein said blocking area comprises an annularly uniform compressed blocking area.

45. A pressurized axial flow fluid filter as described in claim 42 wherein said blocking area comprises a continuously compressed blocking area.

46. A pressurized axial flow fluid filter as described in claim 42 wherein said first and second axial height comprise an average ring height and wherein said blocking area has an average ring height to thickness ratio of approximately 100%.

47. A pressurized axial flow fluid filter as described in claim 41 wherein said first interstitial ring has a secondary taper higher than a secondary taper on said second interstitial ring and wherein said secondary taper on said second interstitial ring is higher than a compression taper on said first interstitial ring.

48. A pressurized axial flow fluid filter as described in claim 41 wherein said first interstitial ring has a secondary taper higher than a secondary taper on said second interstitial ring and wherein a compression taper on said first interstitial ring is higher than said secondary taper on said second interstitial ring.

49. A pressurized axial flow fluid filter as described in claim 41 wherein said first interstitial ring has a secondary taper higher than a secondary taper on said second interstitial ring and wherein a compression taper on said second interstitial ring is higher than a compression taper on said first interstitial ring.

50. A pressurized axial flow fluid filter as described in claim 47, 48, or 49 wherein said secondary and compression tapers on said first interstitial ring faces said second interstitial ring.

51. A pressurized axial flow fluid filter as described in claim 41 wherein said first interstitial ring comprises an outer ring.

52. A pressurized axial flow fluid filter comprising:
  a. a fluid holding container through which a fluid flows wherein said container comprises an inlet and an outlet;
  b. a filtering flow path through which said fluid is filtered; and
  c. a filter assembly fluidically connected to said filtering flow path comprising:
    i. a substantially parallel filtering medium with respect to said filtering flow path to filter said fluid;
    ii. a restrictor element substantially transverse to said filtering flow path and fluidically connected to said substantially parallel filtering medium; and
    iii. at least one lip to engage said substantially parallel filtering medium and block said fluid flow from flowing around at least one edge of said restrictor element.

53. A pressurized axial flow fluid filter as described in claim 52 wherein said lip comprises a curved section of said restrictor element.

54. A pressurized axial flow fluid filter as described in claim 52 further comprising a ring located proximate to said lip wherein said ring assists said lip to engage said substantially parallel filtering medium and block said fluid flow.

55. A pressurized axial flow fluid filter as described in claim 52 wherein said restrictor element substantially equalizes a pressure of said flow across a cross sectional area of said substantially parallel filtering medium.

* * * * *